UNITED STATES PATENT OFFICE.

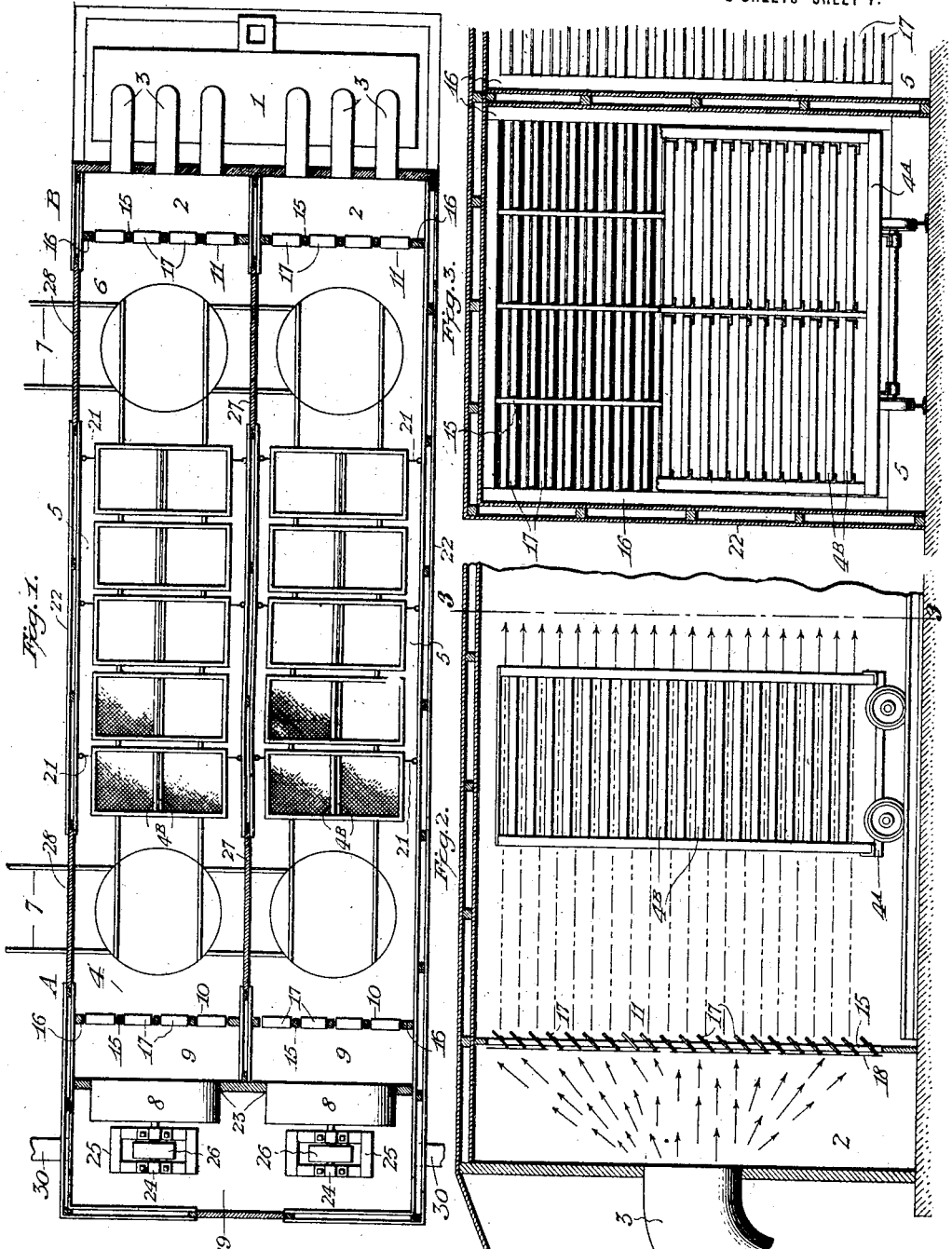

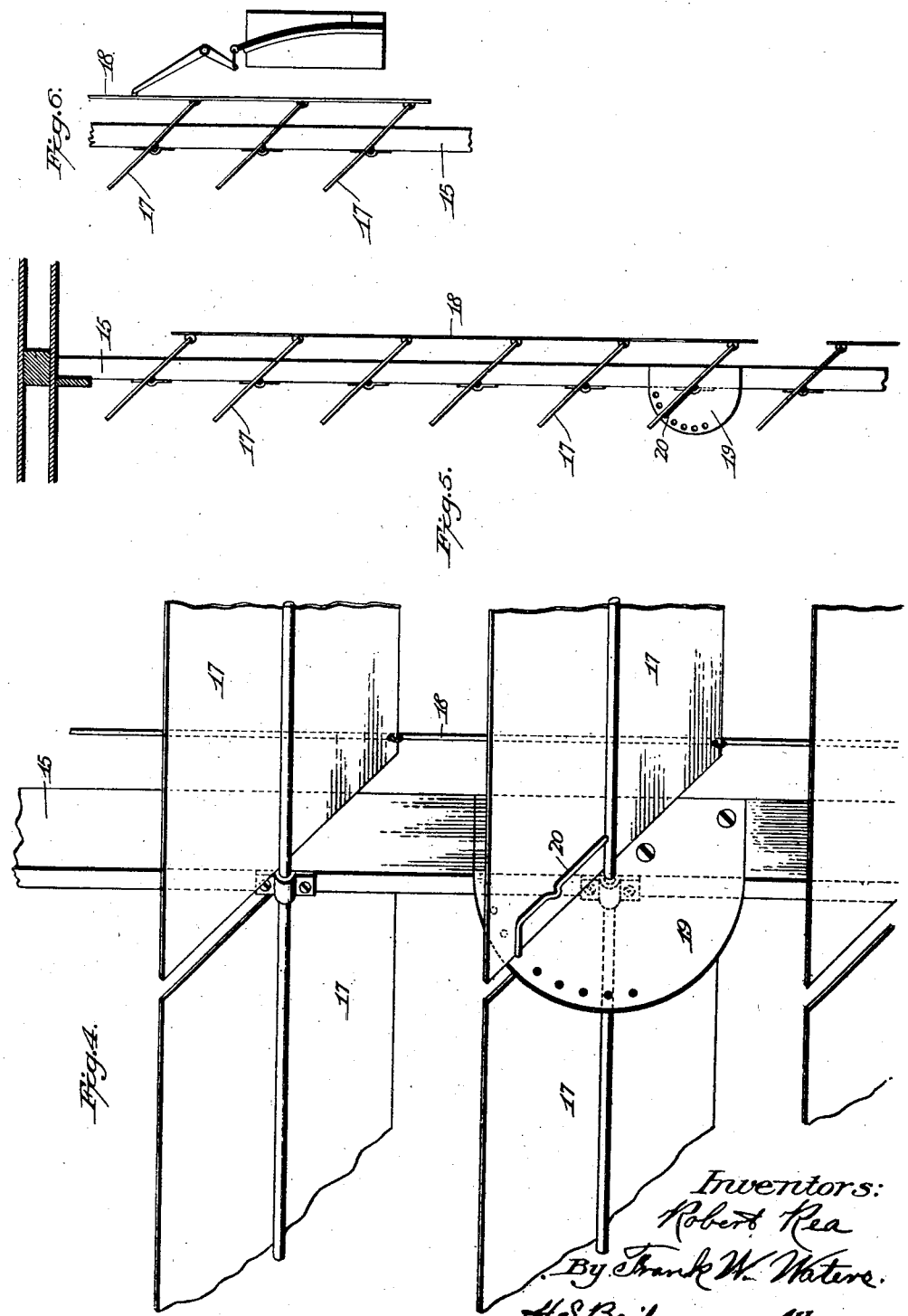

ROBERT REA AND FRANK W. WATERS, OF PORTLAND, OREGON.

HEAT-REGULATING ADJUSTABLE-SHUTTER MECHANISM FOR FOOD-DEHYDRATING PLANTS.

1,328,398.   Specification of Letters Patent.   Patented Jan. 20, 1920.

Application filed November 29, 1918. Serial No. 264,709.

*To all whom it may concern:*

Be it known that we, ROBERT REA and FRANK W. WATERS, citizens of the United States of America, residing at Portland, county of Multnomah, and State of Oregon, have invented a new and useful Heat-Regulating Adjustable-Shutter Mechanism for Food-Dehydrating Plants, of which the following is a specification.

Our invention relates to an improved heating medium regulating adjustable shutter mechanism for fruit and vegetable dehydrating plants, and the objects of our invention are:

First, to provide means for adjustably regulating the heating medium flowing into and through a fruit and vegetable and other food dehydrating furnace.

Second, to provide means for adjustably regulating the heating medium flowing into fruit and vegetable driers so that the heating medium may be directed to the top or center or bottom of the drier in different volumes and in different degrees.

Third, to provide heating medium regulating partitions arranged to extend across fruit and vegetable containing driers at their opposite end portions, said partitions being provided with a plurality of independently, adjustable, pivotally swinging shutters, each independent group of shutters being arranged to be swung pivotally and to be secured in predetermined positions between their full open or closed or in any part of their swinging movement.

We attain these objects by the mechanism illustrated in the accompanying drawings, in which:

Figure 1 is a horizontal, sectional view of a dehydrating apparatus provided with the improved heating medium regulating adjustable shutter mechanism.

Fig. 2 is a vertical, longitudinal, sectional view of the heating medium inlet end of the apparatus showing the heating medium regulating shutter mechanism, and a truck having a stack of trays which are spaced to permit the heated medium to pass between them.

Fig. 3 is a transverse, sectional view on the line 3—3 of Fig. 2, looking toward the heating medium regulating shutter mechanism, part of the trays being omitted for clearer illustration.

Fig. 4 is a perspective view—full size— illustrating the manner of latching the shutters at any desired inclination.

Fig. 5 is a vertical, sectional view through a portion of the shutter partition, showing the manner of connecting a number of shutters so that they may be opened and closed in unison.

Fig. 6 illustrates the manner of automatically opening and closing the shutters by means of a thermostat.

Similar letters of reference refer to similar parts throughout the several views.

Referring to the drawings:

The several leading figures illustrate an adjustable shutter heating medium regulating mechanism embodying our invention.

Inasmuch as our heating medium regulating adujustable shutter was expressly invented to be used in fruit and vegetable dehydrating driers, we illustrate fragmentary views of a drier showing its position, adaptation and use in regulating the heating medium used herein on the product to be dried. A full and complete illustration of a fruit and vegetable dehydrating drying furnace may be seen in our pending application, Serial No. 264,710 filed November 29, 1918, for a dehydrating process.

Our heating mechanism regulating adjustable shutter mechanism is in the form of a vertical partition, and one of these partitions is positioned across the opposite end portion of the drier at a short distance from the end where the heating medium enters the drier.

As a rule, the drier is provided with a fire box furnace 1, built at its end B. The space 2, where the heating medium enters the drier, we term the heating medium regulating room, and the heated air flows into this room through pipes 3, from the furnace.

The drier is adapted to receive car load lots of the product to be dried, and for this purpose has a car track entrance passageway 4, at the opposite end portion from its furnace end. The cars 4^A used on the tracks have a tray supporting frame that extends vertically above them, that supports sliced or whole food product holding trays 4^B, that are spaced at sufficient and equal distances apart to permit heating medium to flow freely between them, as will be fully explained hereinafter. These trays are provided with a wire screen food holding bottom so that the heating medium will circulate freely through them. The drier is also provided with fruit and vegetable drying tunnel shaped chambers 5, between its car entrance passageway and its exit passageway 6, through which car tracks 7 are laid, and through which the car loads of product are moved short distances intermittently toward the furnace end of the drier until the product with which the cars are loaded, is dried.

At the car entrance end of the drier, suction fans 8, are placed that draw the heating medium from the furnace end of the drier through the drying chambers end of the drier. Turn-table switches are provided where needed, for switching the cars from one track to another.

Adjacent to the entrance passageway 4, there is a room 9 across which we place one of our adjustable heating medium regulating partitions, which is used to control, regulate and confine, when desired, the heating medium from the furnace in the chambers 2. Suitable doors are placed at the entrance and exit openings of the drier to confine the heating medium in the chambers and track passageways when the chambers have cars of product drying in them.

This brief description is necessary to show the location of our shutter partitions relative to the furnace or heating medium entrance end of the drier to the drying chambers, the track entrance and exist passageways, and the suction fans.

Our adjustable hot air controlling and regulating members are preferably in the form of vertical partitions that extend from the floor of the drier to its ceiling and across it from side to side.

Our shutter partition comprises in each heating medium regulating room a group of vertically arranged shutters 10 and 11, which extend across each room from the floor to the ceiling of the drier so that all of the heating medium that flows from the heating medium conveying pipes of the furnace must flow between these shutters 11, at the car exit end of the drier before it can enter the drying chambers; and also this heating medium must flow from the furnace end of the drier through the shutter partition 11, and from it into the drying chambers, before it can be drawn out of them through the shutter partition 10 by suction fans 8.

Each of these shutter partitions consists of vertical metal studs 15 and two outside end studs 16, which are secured to the walls of the drier. This shutter partition is preferably divided into eight vertical rows of shutters, and each vertical row of shutters is connected together into a group of six shutters each; each individual shutter comprises a thin strip of metal 17, that is pivoted by a pin to the vertical studs 15, and each six shutters are connected together by a rod 18, so that the six can be swung on their pivotal centers up or down to open them the distance of their centers apart, so that the heating medium can flow freely between them, or move them down so that they are close enough together to prevent any heating medium from flowing between them. This arrangement permits the groups of shutters of each vertical row of shutters to be set at different predetermined angles of their full open positions. We find in practice that it is desirable to secure each set of shutters in their adjusted positions, and while there are a number of ways in which this feature of our invention can be carried out, we preferably employ a segment 19, of a circle that is secured to a stud 15, at one side of each set of shutters, and that is provided with a row of holes arranged in an arc of a circle, and a wire 20 is secured at one end to the shutter rod and is arranged to fit into any hole of the segment. Consequently, having set a shutter group in the desired open position, it is locked there by inserting the free end of the wire into the nearest hole in the segment. If desired, one or more of the groups of shutters may be automatically opened and closed by thermostats operatively connected to them, as shown in Fig. 6.

In order to prevent a current of heating medium from hugging and traveling along the walls of the drier through the drying chambers of the furnace, we place a series of fenders 21, that project from the inside walls far enough to cause the heating medium to flow away from the walls into alinement with the sides of the stack of fruit or vegetable loaded trays on the cars passing through the drying chambers. A set of these shutters is also placed across the heating medium regulating room 9 at the opposite end of the drier. The end A of the drier is the loaded car entrance end, and the shutters at this end are manipulated to hold the heating medium in the chambers at the temperature desired to dehydrate the fruits or vegetables under treatment. At this entrance end of the dehydrating drier, the extreme end of the drier is formed into two separate square compartments that project from the vertical end studs 16, of the shutter partition, that are against the side walls 22 of the drier. The ends of these separated end portions of the drier are made to receive a suction fan 8, which is connected through an opening 23, into each end of each compartment of the drier. The fans are supported in boxes 24, that are secured in base blocks or pedestals 25, and they are driven by a pulley 26, on which is a power transmission belt which we do not illustrate.

It can be seen that by our adjustable shutter heating medium regulating mechanism, one or two or more sets of six shutters can be opened full and be fastened in that position, another one or more sets of six shutters can be partially opened and be set in that position, and still one or more sets can be fully or nearly closed and be set in the desired predetermined position. In this way the heating medium flowing from the furnace into the drier and its chambers is controlled, regulated and directed to flow to the lower or central or upper parts of the cars of loaded product as each portion on the cars dries out faster or slower than other parts, and that the shutters at each end of the drier can be regulated to give an even drying treatment to the cars as they are moved intermittently through the drier.

The operation is as follows:

The shutters are manipulated in groups in each set of vertical shutters of each partition, and each set of vertical shutters faces the end of the drying chamber directly in front of it. Consequently the heating medium flowing from the heating medium regulating room 2, against the shutter partition has to pass through the shutters, from which it crosses the exist track passageway, and then enters the drying chambers. The car loads of product to be dried enter the opposite or entrance end of the drier and are moved against the heating medium entering the end B of the chambers, which flows continuously into and through the drying chamber and across the track entrance passageway 4, to the shutter partition 10, which is positioned in front of the suction fans 8, and the shutters of this partition also are arranged in vertical sets and each set faces the drying chamber directly in front of it.

The heating medium flowing from the furnace through the pipes into the heating medium regulating room is naturally hottest at the ceiling of the drier, and this hottest air if allowed to flow freely through the upper groups of shutters, would flow in substantially direct horizontal paths into the upper parts of the chambers.

The sliced product holding trays on the cars that run into these chambers are spaced at a distance of about three inches apart and extend on the cars from close to the floors of the drying chambers to close to their ceilings, and there are as many shutters in the partitions as there are trays on the cars, and they are made to stand the same distance apart at the trays and opposite to the spaces between the trays. Consequently, the heating medium flowing from the shutters flows directly through the spaces between the trays, and if the hottest heating medium at the top of the drier should flow uncontrolled to the cars of trays in the chambers, the sliced product on the upper trays would be dried quicker than those at the central part of the car loads of trays, and those at the center of the car loads of trays would be dried before those at and adjacent to the floor, or wheel portion of the cars of trays.

It is for this reason that it is necessary to arrange these shutters in groups that can be easily manipulated independently of each other to slow down the volume of heating medium flowing to the ceiling part of the chambers and to so regulate them from time to time to distribute the heating medium from the floor to the ceiling of the chambers evenly, so that the product will dry out evenly.

When two different products are being dehydrated in the two chambers, one that requires say about five hours and another that requires about ten hours, the doors 27 in the passageways 4 and 6 can be closed and then the heating medium will flow from each vertical set of shutters into the chamber in front of them, it being understood that the outside doors 28 of the passageways 4 and 6 are kept closed.

At the suction fan end of the drier, the groups of shutters are manipulated to hold the heating medium back in the chambers or let it be drawn out of them and the entrance passageway 4 as fast as desired.

The compartment 29 back of the suction fans is provided with outlet pipes 30, that convey the heating medium out of the building in which the hot air drier is located, and discharges it into the atmosphere. Thus a continuous circulation of fresh heating medium that is perfectly controlled and regulated by our shutters is maintained in the drying chambers and their car entrance and exit passageways and between the trays on the cars and the heating medium drier, and the cars of food loaded trays are a coöperating factor of our shutters when used in food dehydrating plants.

Our shutter partitions provide a simple and very effective method of regulating and directing the heating medium in any kind of a room, building or structure requiring heating medium regulation, and especially to the different parts of stacked up car loads of trays loaded with sliced product or with product not sliced up, like, for instance, sweet corn, that enables us to give to them or any other food product that is adapted to a drying treatment variable and predetermined adjustments of the direction and volume of the flowing heating medium, that give to the product to be dried an even heating medium dehydrating treatment throughout the height and width and length of the chambers or chamber tunnels of the drier.

And while we have illustrated and described the preferred construction and arrangement of our heating medium regulating shutter partition for the heating medium food driers of dehydrating plants, we do not wish to be limited to it, as changes can be made therein without departing from the spirit of our invention.

Having described our invention, what we claim as new and desire to secure by Letters Patent, is:

1. In a heating medium regulating adjustable shutter mechanism for fruit and vegetable dehydrating driers containing two food drying chambers, the combination of a pair of independent positioned partitions comprising fixed members and pivotally swinging shutters between said fixed members, said shutters being arranged in independent groups of several shutters each, and means including a fastening device comprising the semicircular plate, and a wire partly secured to each group of shutters, and to a fixed part of said partitions for securing each group of shutters in predetermined parts of this open or closed position, with a food product dehydrating drier comprising the box shaped structure containing entrance and exit passageways, and the chambers provided with car tracks and arranged to receive car loads of product to be dried; said shutter partitions being placed across the opposite ends of said drier directly in front of and facing the opposite ends of said chambers; the independent groups of shutters in each vertical row of shutters being arranged and adapted to regulate the flow of the heating medium into and through said chambers.

2. In a heating medium regulating adjustable shutter mechanism for fruit and vegetable dehydrating driers, the combination of a partition comprising fixed members and pivotally swinging shutters between said fixed members, said shutters being arranged in independent groups, and means including a fastening device secured partly to each group of shutters and partly to a fixed part of said partition for securing each group of shutters in predetermined set positions, with a food product dehydrating drier comprising the box shaped structure containing entrance and exit passageways, and the chambers provided with car tracks, and with the cars provided with fruit and vegetable and other product holding vertically stacked trays, said trays being spaced at the same distance apart as said shutters, whereby the currents of heating medium flowing through said shutters flow between said trays.

3. A heating medium regulating adjustable shutter partition for fruit and vegetable driers, comprising a drier provided with two open ended drying chambers, a vertical metal partition extending across each end portion of said drier, adjacent to the open ends of said chambers consisting of fixed vertical stud members, two vertical rows of pivotally swinging overlapping shutters arranged in independent vertical rows of several shutters each facing the open opposite ends of each chamber, the shutters of each independent group of each of said vertical row of shutters being connected partly together by a rod to swing open or shut together, a semicircular plate secured to a fixed stud at each group of shutters, and provided with a curved row of holes connected at one end to the center bar of one of the shutters of each group of shutters and provided with a free end bent at right angles toward and arranged to fit into the holes in said semicircular plate whereby each independent group of shutters in each vertical row of shutters in each vertical partition can be adjustably set at any desired predetermined degree of their pivotally swinging opening or closing positions.

In testimony whereof we affix our signatures in presence of two witnesses.

ROBERT REA.
FRANK W. WATERS.

Witnesses:
   G. SARGENT ELLIOTT,
   ELIZABETH SMITH.